(12) United States Patent
Howell

(10) Patent No.: US 7,611,107 B2
(45) Date of Patent: Nov. 3, 2009

(54) STRUCTURAL BRIDGING FASTENER

(75) Inventor: Robert Howell, Brooklin (CA)

(73) Assignee: Multimatic Inc., Markham, Ontario (CA)

( * ) Notice: Subject to any disclaimer, the term of this patent is extended or adjusted under 35 U.S.C. 154(b) by 0 days.

(21) Appl. No.: 11/271,148

(22) Filed: Nov. 10, 2005

(65) Prior Publication Data

US 2007/0102602 A1 May 10, 2007

(51) Int. Cl.
*F16M 11/00* (2006.01)

(52) U.S. Cl. .................... 248/200; 248/300; 248/220.1; 52/712; 52/713

(58) Field of Classification Search ................. 248/200, 248/300, 220.1, 339, 304; 52/712, 713; 411/171
See application file for complete search history.

(56) References Cited

U.S. PATENT DOCUMENTS

| | | | | |
|---|---|---|---|---|
| 1,056,530 | A | | 3/1913 | Freirich |
| 1,286,588 | A | * | 12/1918 | Goodykoontz ............... 108/28 |
| 1,325,143 | A | * | 12/1919 | Conterio ...................... 108/42 |
| 2,032,017 | A | * | 2/1936 | Hocher et al. ............ 248/309.2 |
| 2,413,370 | A | * | 12/1946 | Palmer ........................ 403/271 |
| 2,474,259 | A | * | 6/1949 | Lapham, Jr. ................ 336/67 |
| 2,952,129 | A | * | 9/1960 | Dempsey ................. 405/259.6 |
| 3,265,344 | A | * | 8/1966 | Ornstein ...................... 248/243 |
| 3,747,540 | A | * | 7/1973 | Salkoff et al. ............... 108/156 |
| 3,890,758 | A | * | 6/1975 | Bouchard .................... 52/713 |
| 3,964,230 | A | * | 6/1976 | Fischer ......................... 52/698 |
| 4,075,903 | A | * | 2/1978 | Cornell ......................... 74/493 |
| 4,179,137 | A | * | 12/1979 | Burke ......................... 280/775 |
| 4,202,083 | A | * | 5/1980 | Gutner ......................... 29/897 |
| 4,555,082 | A | * | 11/1985 | Sack et al. .............. 248/220.1 |
| 4,995,206 | A | * | 2/1991 | Colonias et al. ............... 522/97 |
| 5,312,005 | A | * | 5/1994 | Odell ......................... 211/189 |
| 5,802,781 | A | * | 9/1998 | Eickhof ...................... 52/136 |
| 5,803,686 | A | * | 9/1998 | Erbes et al. ................... 411/55 |
| 5,896,721 | A | * | 4/1999 | Sugiyama ..................... 52/712 |
| 5,911,664 | A | * | 6/1999 | Masters et al. ................ 52/698 |
| 5,946,875 | A | * | 9/1999 | Jeanseau .................. 52/506.08 |
| 6,027,088 | A | * | 2/2000 | Stedman et al. ............ 248/200 |
| 6,079,920 | A | * | 6/2000 | Dispenza .................... 411/107 |
| 6,109,576 | A | * | 8/2000 | Szewczyk ................... 248/200 |
| 6,318,672 | B1 | * | 11/2001 | Traylor ................... 244/118.5 |
| 6,485,240 | B2 | * | 11/2002 | Stumpf et al. ............... 411/171 |

(Continued)

*Primary Examiner*—J. Allen Shriver, II
*Assistant Examiner*—Michael McDuffie
(74) *Attorney, Agent, or Firm*—Fredrikson & Byron, P.A.

(57) ABSTRACT

A mounting bracket and structural bridging fastener comprises an angle mounting bracket attached to a stable base, the bracket comprising a substantially planar main body and a mounting plate oriented perpendicular to the main body, the mounting plate and main body being connected through a complex formation in the angle mounting bracket, a loaded subcomponent configured to be attached to the mounting bracket so that the attachment point of the loaded subcomponent is aligned directly with the main body, a fastener comprising a structural portion adapted to lie between and be rigidly fastened to the mounting plate and to the main body adjacent the complex formation, with the fastener further comprising a threaded portion adapted to connect the loaded subcomponent to the mounting plate. The threaded portion may be an extension of the structural portion adapted to receive a nut, or the threaded portion may be internal to the structural portion and adapted to receive a bolt. The mounting bracket and structural bridging fastener is particularly adapted to secure a vehicular steering column assembly to a vehicular cross-car instrument panel structure.

32 Claims, 8 Drawing Sheets

U.S. PATENT DOCUMENTS

| | | | |
|---|---|---|---|
| 6,625,945 B2* | 9/2003 | Commins | 52/293.3 |
| 6,662,517 B1* | 12/2003 | Thompson | 52/714 |
| 6,669,156 B2* | 12/2003 | East et al. | 248/300 |
| 6,709,213 B2* | 3/2004 | Bailey | 411/384 |
| 6,783,102 B2* | 8/2004 | Kirschner | 248/75 |
| 2002/0084391 A1* | 7/2002 | Ke et al. | 248/200 |
| 2003/0024171 A1* | 2/2003 | Kao | 52/27 |
| 2004/0094681 A1* | 5/2004 | Birnbaum | 248/300 |
| 2004/0099781 A1* | 5/2004 | Podue et al. | 248/300 |
| 2006/0260261 A1* | 11/2006 | Cervenko | 52/712 |

* cited by examiner

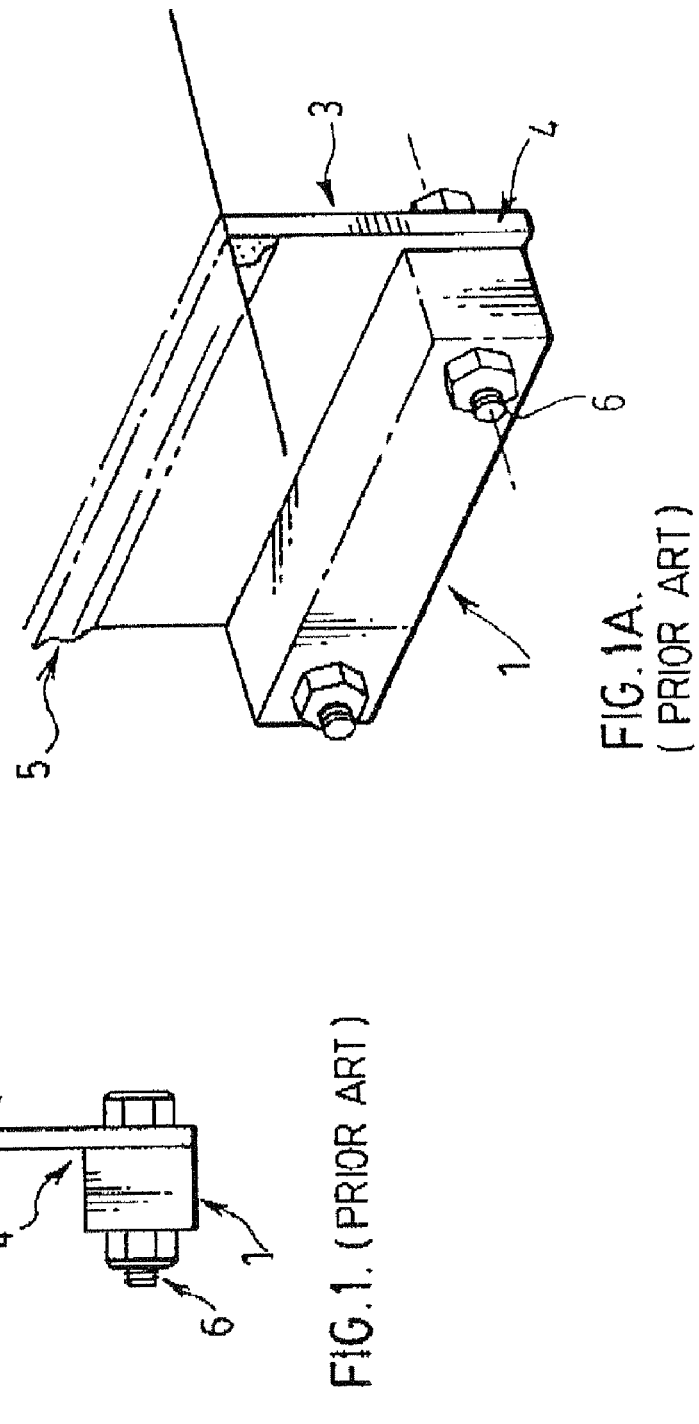

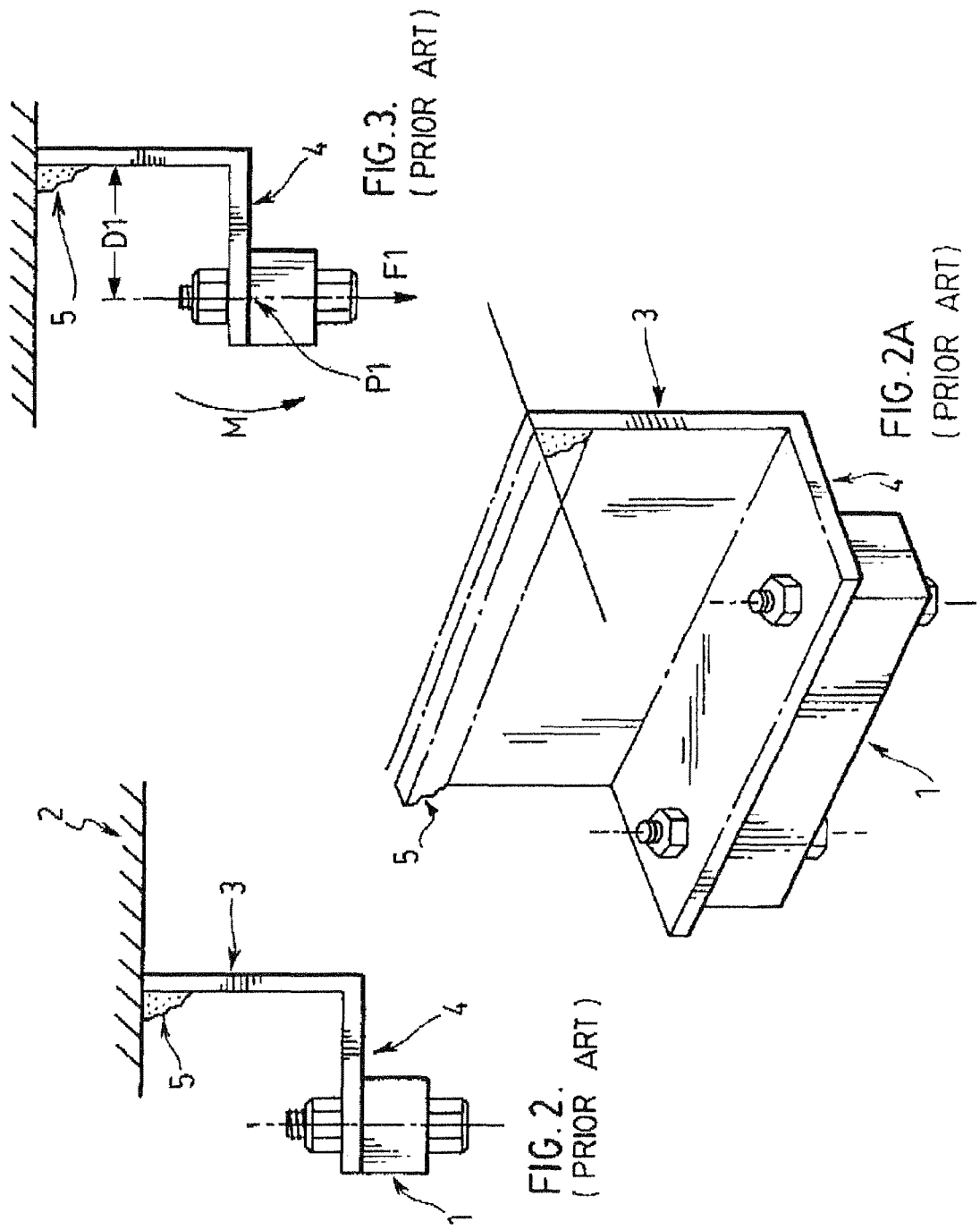

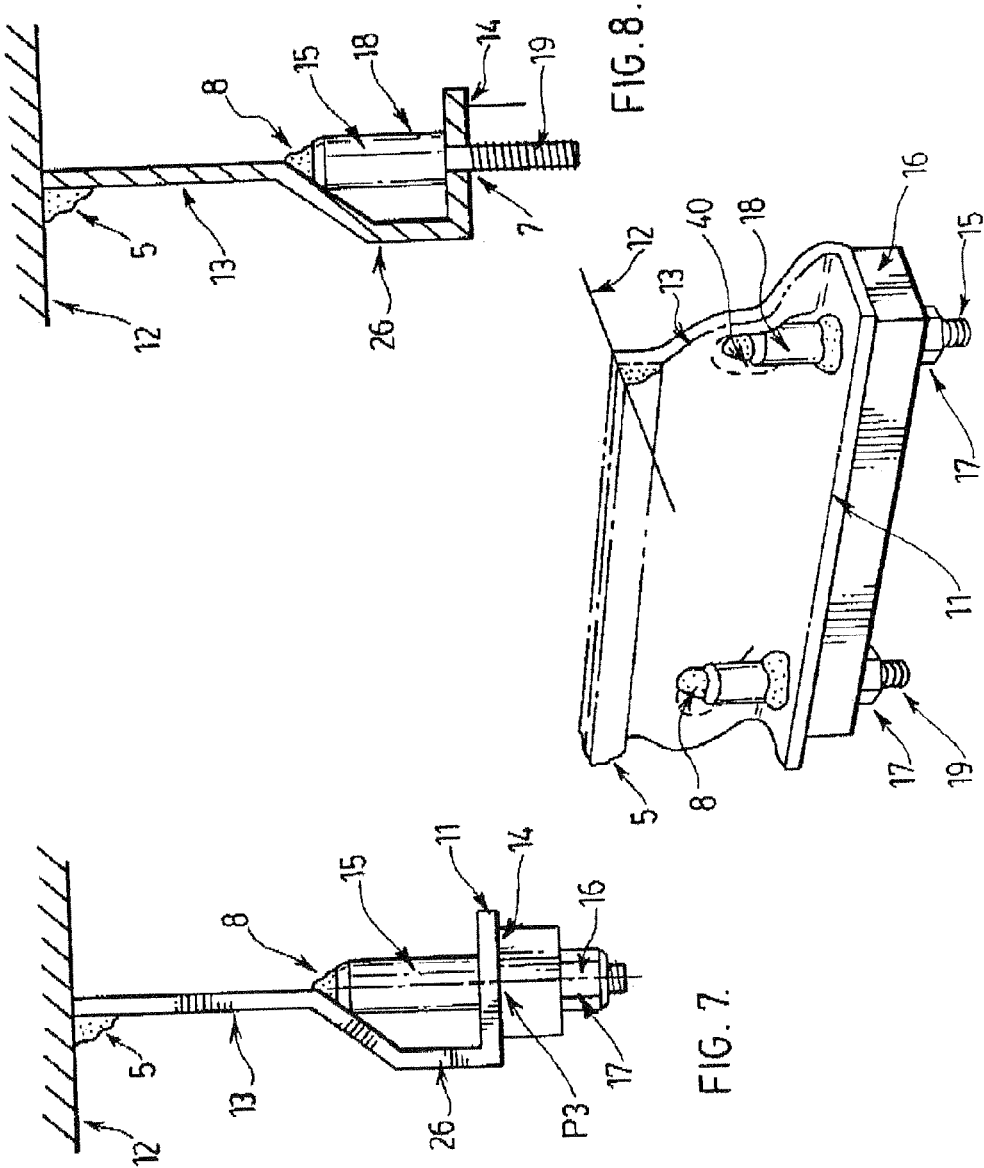

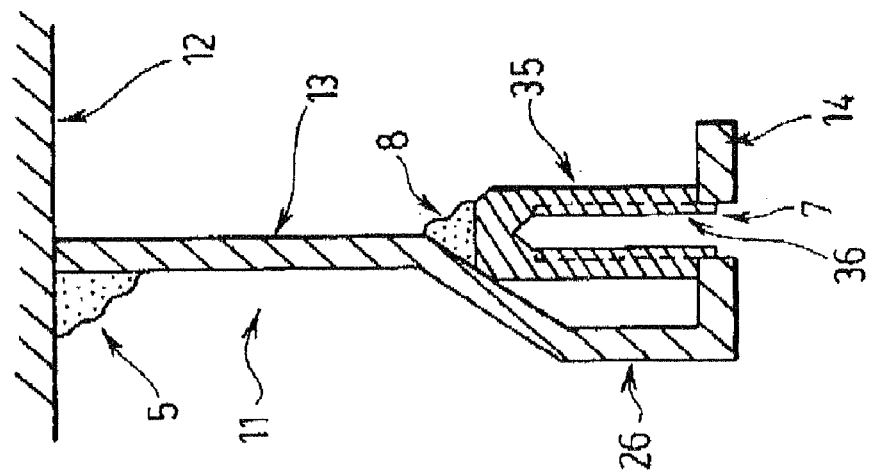
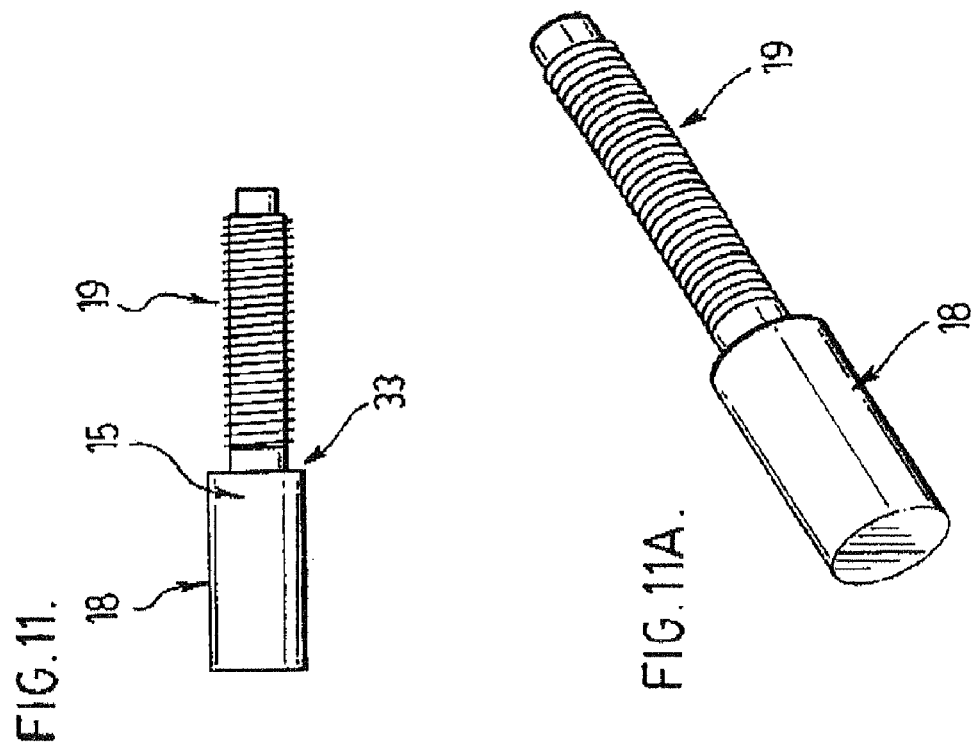

«STRUCTURAL BRIDGING FASTENER»

STRUCTURAL BRIDGING FASTENER

FIELD OF THE INVENTION

This invention relates to a threaded fastening device (fastener) configured to attach a loaded subcomponent to an angle mounting bracket while additionally enhancing the structural performance of the mounting bracket.

DESCRIPTION OF THE PRIOR ART

It is a common requirement to attach a loaded subcomponent (1) to a base structure (2) via a mounting bracket (3) as shown in prior art FIGS. 1 and 1A. Additionally, to facilitate ease of replacement, it is also common practice to attach the subcomponent (1) to the mounting bracket (3) via at least one threaded fastener (6) while the mounting bracket may be attached to the base structure via a wide range of methods that include welding, bonding, riveting, clinching, upset forming, bolting, or similar means, to form a joint (5). The mechanical fastening of the loaded subcomponent to the mounting bracket primarily relies on the threaded fasteners (6) generating sufficient clamping load between the subcomponent (1) and mounting bracket mounting plate (4).

In many cases, it is also a requirement to configure the mounting plate (4) in a perpendicular orientation to the main body of the mounting bracket as shown in prior art FIGS. 2 and 2A. This perpendicular mounting configuration requires an "angle bracket" that significantly reduces the structural stiffness and strength of the joint owing to the moment (M) induced in the mounting bracket via the subcomponent imparted force (F1) acting through the necessary offset (D1) to the fastening point (P1) as illustrated in prior art FIG. 3. This structural deficiency can be countered by configuring the angle mounting bracket to more effectively transfer load by increasing material thickness or strength or reconfiguring the mounting bracket geometry. The most common geometric configuration of a mounting bracket (3) that offers a mounting plate (4) perpendicular to its main body is a "U" shape as shown in prior art FIG. 4. However, despite being structurally robust, the "U" shaped mounting bracket requires a significant weight increase over a single plane configuration to provide the required mounting orientation.

There are a number of prior art configurations that have been developed to overcome the inherent deficiencies of a simple "angle bracket" or the weight penalty of the "U" shaped bracket. One such prior art embodiment is illustrated in FIG. 5 and utilizes a two-piece mounting bracket construction with a lower section (40) and an upper section (41) to minimize or eliminate the fastening point offset. FIG. 5 shows the subcomponent (1) and associated fastening point (P2) being in-line with the mounting bracket centreline. In a simpler prior art embodiment, the fastening point offset and induced moment is eliminated in a single piece mounting bracket (10) by introducing a complex formation (25) as illustrated in FIG. 6. Although this complex shaped mounting bracket is capable of aligning the fastening point with the main structure of the mounting bracket and minimizing or eliminating the offset, there is still a bending moment induced in the local area of the complex formation that can lead to unacceptable loaded deformation and high induced stresses.

SUMMARY OF THE INVENTION

Accordingly, it would be advantageous to provide a simple, single-piece angle mounting bracket, capable of mounting a loaded subcomponent to a base structure, perpendicularly oriented to the main body of the mounting bracket, to provide an in-line configuration to eliminate fastening point offset while minimizing the loaded deformation and stresses in local areas of the structure. It would be beneficial to form the bracket with the minimum of material using simple manufacturing methods, such as press form stamping, etc.

The present invention provides a local stiffening means to reduce the deformation and stresses induced in the complex formation required by a single-piece angle mounting bracket to align the fastening point with the main body of the mounting bracket. The local stiffening means of the present invention is incorporated into a fastening device which is configured with a threaded portion at one end for attachment of a subcomponent to the mounting plate of the angle mounting bracket and a non-threaded structural portion at the opposing end that is rigidly attached to the main body of the angle mounting bracket to create a structural bridge between the mounting surface and the main body. In this manner a highly efficient structure can be realized through the simple addition of a non-threaded structural portion to the fastening device that is required to mount the subcomponent to the angle mounting bracket. Structural stiffness and strength equivalent to a two-piece or "U" shaped mounting bracket can be realized with a single-sided bracket configuration, which results in significant weight and cost savings due to reduced material content.

The threaded portion of the inventive fastening device can be configured to protrude from the mounting surface of the angle mounting bracket to accept a nut, or can be internally threaded to accept a bolt, for attachment of the subcomponent to the angle mounting bracket. In a preferred embodiment of the inventive fastening device, a stepped shoulder is incorporated at the interface between the protruding threaded portion and the structural portion to facilitate ease of installation and attachment. The inventive fastening device is configured to be rigidly attached to both the mounting plate and the main body of the angle mounting bracket via welding, bonding, riveting, clinching, upset forming, bolting, or similar means. In a further embodiment, the main body of the angle bracket can be configured with a local formation adapted to nest the non-threaded structural portion of the fastening device to enhance its rigid attachment.

The structural portion of the inventive fastening device can be configured to be a cylindrical extension of the threaded portion so as to simplify manufacture or can be shaped to abut, nest into, or mate with a portion adjacent the joinder of the complex formation and the main body to enhance its rigid attachment to the angle mounting bracket. The inventive fastening device can be manufactured by cold heading, machining, forging or similar means.

In a principal aspect of the invention, a mounting bracket and structural bridging fastener comprises: an angle mounting bracket attached to a stable base, the bracket comprising a substantially planar main body and a mounting plate oriented perpendicular to the main body; said mounting plate and main body being connected through a complex formation in the angle mounting bracket; a loaded subcomponent configured to be attached to the mounting plate so that the attachment point of the loaded subcomponent is aligned directly with the main body, a fastener comprising a structural portion adapted to lie between and be rigidly fastened to the mounting plate and to the main body adjacent the complex formation; and said fastener further comprising a threaded portion adapted to connect the loaded subcomponent to the mounting plate.

In further aspects of the mounting bracket and structural bridging fastener of the invention:

a) the structural portion of the fastener is non-threaded; the threaded portion of the fastener comprises a threaded rod extending from the structural portion adapted to pass through the mounting plate; and the loaded subcomponent comprises an opening through which the threaded portion may pass; whereby the loaded subcomponent may be attached to the mounting plate by means of a nut tightened onto a section of the threaded portion extending beyond the loaded subcomponent;

b) the structural portion of the fastener comprises an internal threaded portion adapted to receive a matching bolt and the loaded subcomponent comprises an opening through which the bolt may pass; whereby the loaded subcomponent may be attached to the mounting plate by means of the bolt passing through both the loaded subcomponent and the mounting plate to be threaded into the threaded portion of the fastener;

c) the fastener comprises a step shoulder a stepped shoulder at the interface of the structural portion and the threaded portion to facilitate ease of installation of the fastener to the mounting plate;

d) the structural portion comprises a cylindrical extension of the threaded portion;

e) the main body of the mounting bracket is configured with a local formation adapted to receive and nest a similarly shaped segment of the structural portion to facilitate rigid attachment of the fastener to the bracket;

f) the fastener is rigidly attached to the mounting plate and to the bracket adjacent the joint between the main body and the complex formation by means of one or more of welding, adhesive bonding, riveting, clinching, upset forming or bolting:

In a specific embodiment of the invention, amounting bracket and structural bridging fastener is adapted to secure a vehicular steering column assembly to a vehicular cross-car instrument panel structure, comprising: an angle mounting bracket attached to the instrument panel structure, the bracket comprising a substantially planar main body and a mounting plate oriented perpendicular to the main body; said mounting plate and main body being connected through a complex formation in the angle mounting bracket; the vehicular steering column assembly being configured to be attached to the mounting plate so that the attachment point of the steering column assembly is aligned directly with the main body; a fastener comprising a structural portion adapted to lie between and be rigidly fastened to the mounting plate and to the main body adjacent the complex formation; said fastener further comprising a threaded portion adapted to connect the steering column assembly to the mounting plate.

In further aspects of the specific automotive embodiment of the invention:

a) the structural portion of the fastener is non-threaded; the threaded portion of the fastener comprises a threaded rod extending from the structural portion adapted to pass through the mounting plate; and the steering column assembly comprises an opening through which the threaded portion may pass; whereby the steering column assembly may be attached to the mounting plate by means of a nut tightened onto a portion of the threaded portion extending beyond the steering column assembly;

b) the structural portion of the fastener comprises an internal threaded portion adapted to receive a matching bolt; and the steering column assembly comprises an opening through which the bolt may pass; whereby the steering column assembly may be attached to the mounting plate by means of the bolt passing through both the steering column assembly and the mounting plate to be threaded into the threaded portion of the fastener;

c) the fastener comprises a stepped shoulder at the interface of the structural portion and the threaded portion;

d) the structural portion comprises a cylindrical extension of the threaded portion;

e) the main body of the mounting bracket is configured with a local formation adapted to receive and nest a similarly shaped segment of the structural portion to facilitate rigid attachment of the fastener to the bracket;

f) the fastener is rigidly attached to the mounting plate and to the main body adjacent the complex formation by means of one or more of welding, adhesive bonding, riveting, clinching, upset forming or bolting;

In a further aspect of the invention, a fastener is adapted to bridge two segments of an angle mounting bracket and to be rigidly fastened to each said segment, namely at a mounting plate and at a main body adjacent a complex formation of the bracket; said fastener comprising a structural portion adapted to be so fastened to the bracket; said fastener further comprising a threaded portion adapted to facilitate connection of a loaded subcomponent to the mounting plate.

In additional aspects of the fastener of the invention:

a) the structural portion of the fastener is non-threaded; the threaded portion of the fastener comprises a threaded rod extending from the structural portion adapted to pass through the mounting plate; the threaded portion being adapted to pass through an opening in the loaded subcomponent and to receive a matching nut which may be tightened to attach the loaded subcomponent to the mounting plate;

b) the structural portion of the fastener comprises an internal threaded portion adapted to receive a matching bolt, the bolt being adapted to pass through an opening in the loaded subcomponent, through the mounting plate and into the threaded portion such that tightening the bolt attaches the loaded subcomponent to the mounting plate;

c) the fastener further comprises a stepped shoulder at the interface of the structural portion and the threaded portion;

d) the structural portion comprises a cylindrical extension of the threaded portion;

e) a segment of the structural portion is shaped to be received by and nested into a local formation in the main body of the mounting bracket to facilitate rigid attachment of the fastener to the bracket;

In a further aspect of the invention, a method of manufacturing a fastener adapted to bridge two segments of an angle mounting bracket and to be fastened to each said segment, and further to receive a loaded subcomponent to be mounted to a mounting plate on said bracket, said fastener comprising a non-threaded structural portion and a threaded portion comprising a threaded rod extending from the structural portion adapted to pass through the mounting plate and an opening in the loaded subcomponent and to receive a nut, wherein the structural portion comprises a cylindrical extension of the threaded portion, so formed for ease of manufacture, and wherein said fastener is formed by cold heading, machining, forging or similar means.

BRIEF DESCRIPTION OF THE DRAWINGS

FIG. 1 is a longitudinal elevation view of a typical prior art mounting bracket arrangement for mounting a loaded subcomponent to a base structure;

FIG. 1A is a perspective view of a typical prior art mounting bracket arrangement for mounting a loaded subcomponent to a base structure;

FIG. 2 is a longitudinal elevation view of a typical prior art angle mounting bracket arrangement for mounting a loaded subcomponent to a base structure in a perpendicular orientation to the main body of the mounting bracket;

FIG. 2A is a perspective view of a typical prior art angle mounting bracket arrangement for mounting a loaded subcomponent to a base structure in a perpendicular orientation to the main body of the mounting bracket;

FIG. 3 is a longitudinal elevation view of a typical prior art angle mounting bracket arrangement for mounting a loaded subcomponent to a base structure in a perpendicular orientation to the main body of the mounting bracket showing the force system generated by the loaded subcomponent;

FIG. 7 is a longitudinal elevation view of the inventive fastening device assembled in an angle mounting bracket arrangement for mounting a loaded subcomponent to a base structure in a perpendicular orientation to the main body of the mounting bracket;

FIG. 7A is a perspective view of the inventive fastening device assembled in an angle mounting bracket arrangement for mounting a loaded subcomponent to a base structure in a perpendicular orientation to the main body of the mounting bracket;

FIG. 8 is a sectional elevation view of the inventive fastening device assembled in an angle mounting bracket arrangement for mounting a loaded subcomponent to a base structure in a perpendicular orientation to the main body of the mounting bracket;

FIG. 11 is a side elevation view of a preferred embodiment of the inventive fastening device;

FIG. 11A is a perspective view of a preferred embodiment of the inventive fastening device;

FIG. 12 is a sectional elevation view of an alternative embodiment of the inventive fastening device assembled in an angle mounting bracket arrangement for mounting a loaded subcomponent to a base structure in a perpendicular orientation to the main body of the mounting bracket;

DETAILED DESCRIPTION OF THE INVENTION

Figure 6:
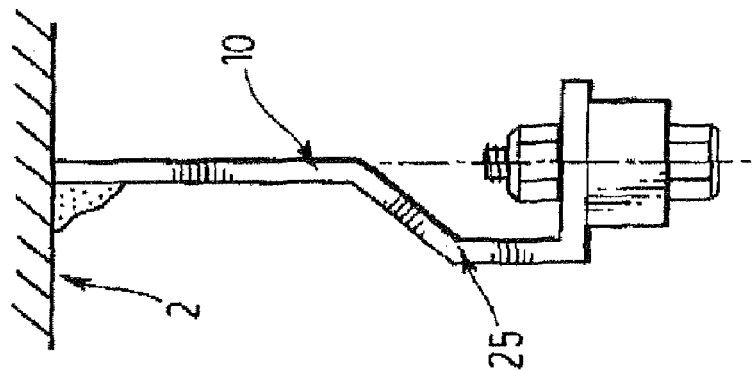
FIG. 6 is a longitudinal elevation view of a typical prior art angle mounting bracket arrangement for mounting a loaded subcomponent to a base structure in a perpendicular orientation to the main body of the mounting bracket which uses a complex formation to bring the load in-line with the main body of the mounting bracket.

FIGS. 7 and 8 illustrate an angle mounting bracket (11) attached to abase structure (12) via welding, bonding, riveting, clinching, upset forming, bolting, or similar means, to form a joint (5). The angle mounting bracket (11) is configured with a substantially planar main body (13) and a mounting plate (14) oriented perpendicularly to the main body. A complex formation (26) allows the load point (P3) of the mounting plate (14) to be aligned directly with the axis of the substantially planar main body (13). In a first embodiment, at least one inventive fastening device (15) is fixed at the load point (P3) through a hole or orifice (7) in the mounting plate (14) of the mounting bracket via welding, bonding, riveting, clinching, upset forming, bolting, or similar means. As illustrated in FIGS. 7, 8 and 11A, the inventive fastening devices (15) include a threaded portion (19) protruding from the mounting plate (14). A loaded subcomponent (16) may be secured to the mounting plate (14) using the threaded portion (19) by generating the required clamping load via matching threaded nuts (17). The inventive fastening devices (15) additionally include a non-threaded structural portion (18) which opposes the threaded portion (19) and is configured to be rigidly attached to the main body (13) via welding, bonding, riveting, clinching, upset forming, bolting, or similar means, to form a fastener joint (8). In this manner the inventive fastening device creates a structural bridge between the mounting plate (14) and the main body (13) of the angle mounting bracket.

Figure 5:
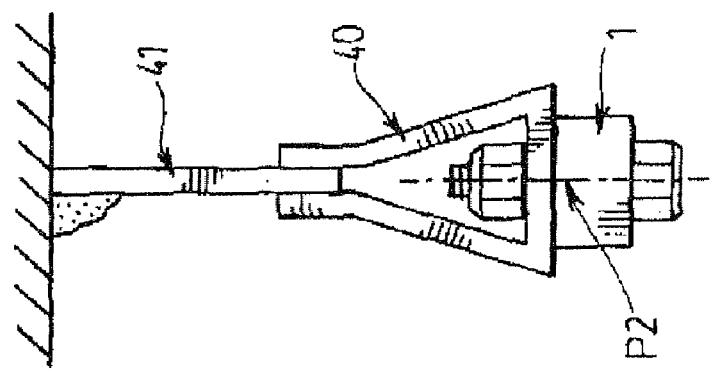
FIG. 5 is a longitudinal elevation view of a typical prior art two-piece, in-line load, mounting bracket arrangement for mounting a loaded subcomponent to a base structure in a perpendicular orientation to the main body of the mounting bracket.
Figure 4:
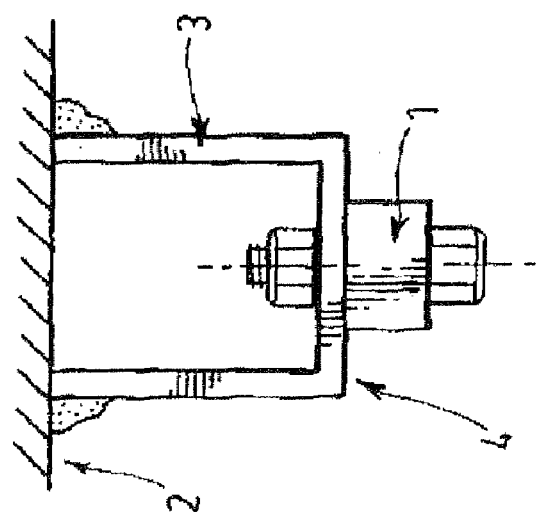
FIG. 4 is a longitudinal elevation view of a typical prior art U-shaped mounting bracket arrangement for mounting a loaded subcomponent to a base structure in a perpendicular orientation to the main body of the mounting bracket.

As shown in FIGS. 7 and 8 illustrating the invention, the load imparted by the subcomponent does not generate a moment on the main body (13) of the angle mounting bracket (11) since the load point (P3) is substantially aligned with the axis of the main body (13) via the complex formation (26). This is a similar benefit to the prior art structures illustrated in FIGS. 5 and 6. However, the bending moment induced in the local area of the complex formation (25) in prior art FIG. 6, is not present at the complex formation (26) in FIG. 8 of the present invention by reason of the bridging structure of the non-threaded structural portion (18) of the inventive fastening device (15).

FIGS. 11 and 11A illustrate a preferred embodiment of the inventive fastening device (15) which incorporates a stepped shoulder (33) at the interface between the threaded portion (19) and structural portion (18) to facilitate ease of installation. As shown, the inventive fastening device (15) is a one-piece, or integral, body.

The non-threaded structural portion (18) of the inventive fastening device can be configured to be a cylindrical extension of the threaded portion (19) as illustrated in FIGS. 11 and 11A so as to simplify manufacture, or can be shaped with complex formations to enhance its rigid attachment to the main body (13) of the angle mounting bracket. The inventive fastening device can be manufactured by cold heading, machining, forging or similar means.

FIG. 7A illustrates a preferred embodiment of the present invention in which the main body (13) of the angle mounting bracket (11) is configured with a local formation (40) adapted to receive and nest the non-threaded structural portion (18) of the inventive fastening device (15). In this manner the structural integrity of the rigid attachment of the non-threaded structural portion (18) to the main body (13) is enhanced. The loaded subcomponent (16) is fastened to the mounting plate (14) of the angle mounting bracket (11) using the threaded portion (19) of the fastener by generating the required clamping load using matching threaded nuts (17).

Figure 9:
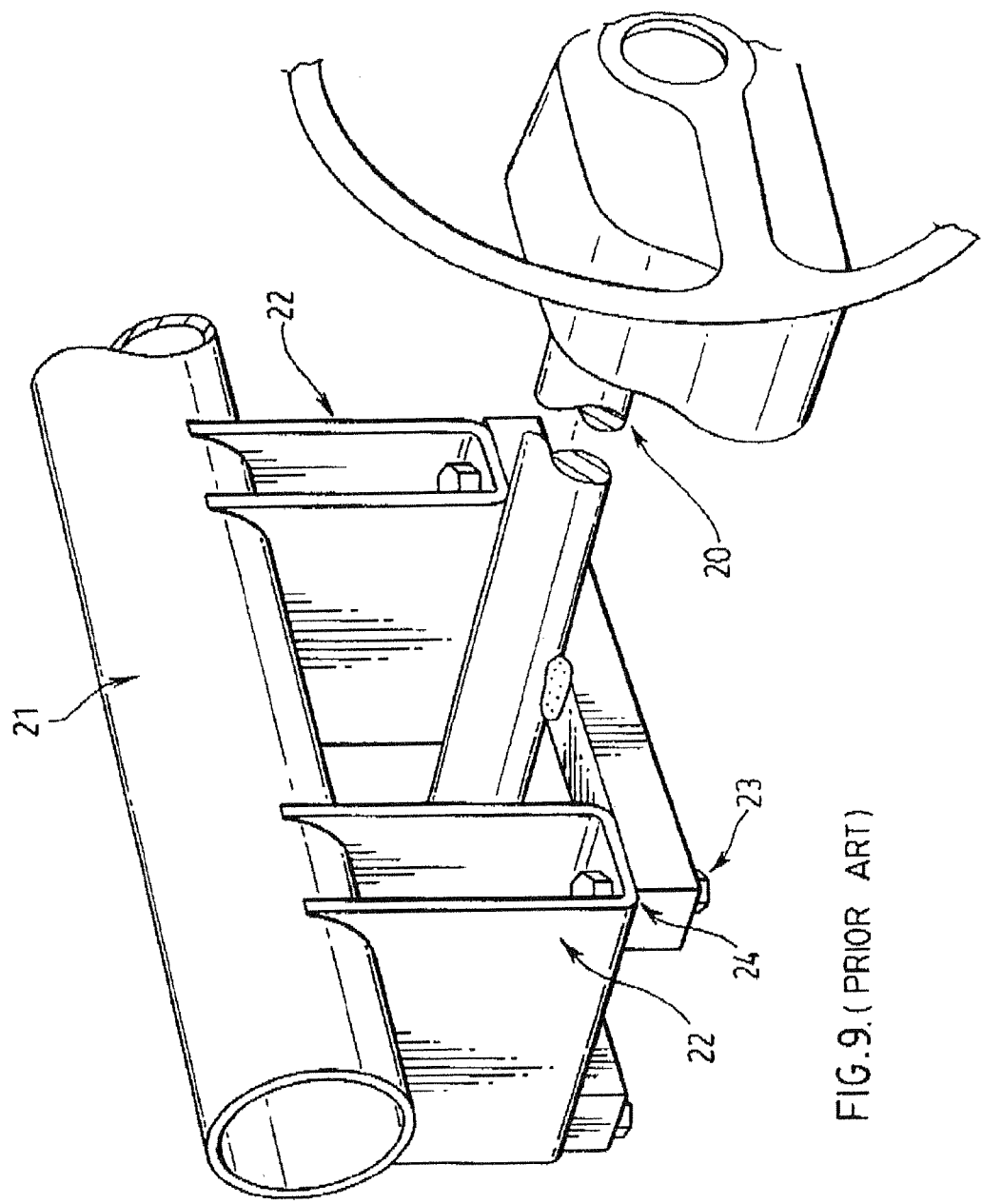
FIG. 9 is a perspective view of a typical prior art mounting bracket arrangement for mounting a vehicular steering column assembly to a cross car beam structure.

FIG. 9 illustrates a prior art approach to a typical application of the present invention which is the attachment of a vehicular steering column assembly (20) to a cross car beam structure (21) via mounting brackets (22). The mounting brackets and cross car beam structure must provide a stable platform so that air bag firing loads are properly resisted during a crash event and additionally so that the significant masses of the steering wheel and air bag do not become excited by engine idle and other operating frequencies. Because of these rigorous structural requirements, the most common prior art steering column mounting bracket configuration is a "U" shape, as shown in FIG. 9. Two of these "U" brackets (22) are welded to the tubular cross car beam (21) at a distance dictated by the geometry of the steering column assembly (20). Threaded fasteners (23) are fixed to the mounting plate (24) of the "U" brackets which serves to clamp the steering column to the mounting plate.

Figure 10:
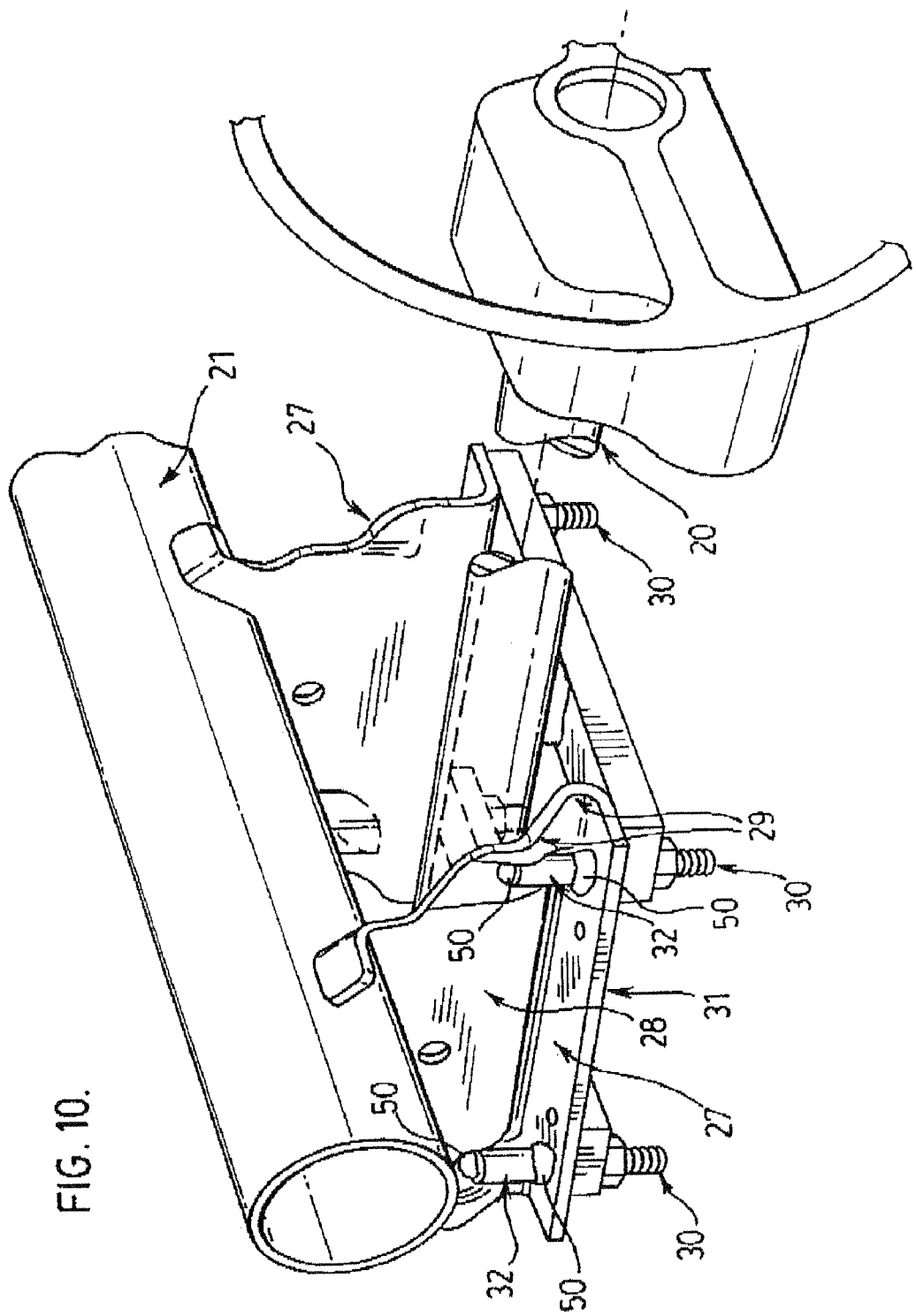
FIG. 10 is a perspective view of the inventive fastening device assembled into an angle mounting bracket arrangement for mounting a vehicular steering column assembly to a cross car beam structure.

A steering column mounting configuration utilizing the present inventive fastening devices is illustrated in FIG. 10 and consists of two angle mounting brackets (27) welded to the tubular cross car beam (21). The angle mounting brackets are configured with a substantially planar main body (28) and a complex formation (29) that aligns the load points with the planar main body of the angle mounting brackets. The inventive fastening devices (30) of the present invention are fixed through holes in the mounting plate (31) of the angle mounting brackets (27) and are configured with a non-threaded structural portion (32) that bridges between the mounting plate (31) and planar main body (28) being fixed to them via welding (50). In this manner the loads imparted by the steering wheel and air bag are transferred to the tubular cross car beam (21) in an efficient and direct manner through the inventive fastening devices (30) into the planar main body (28) of the angle mounting brackets (27) therefore eliminating any disagreeable force moment due to load offset. Because the load transfer is linear and direct, a lighter gauge, lower cost mounting bracket can be utilized to achieve structural performance equivalent to a more conventional U-shaped mounting bracket.

Figure 13:
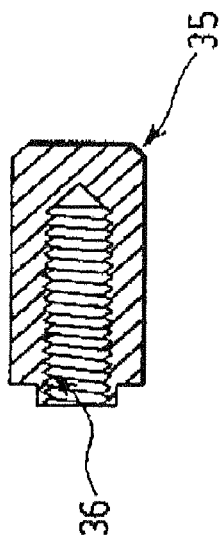
FIG. 13 is a sectional elevation view of an alternative embodiment of the inventive fastening device.
Figure 13A:
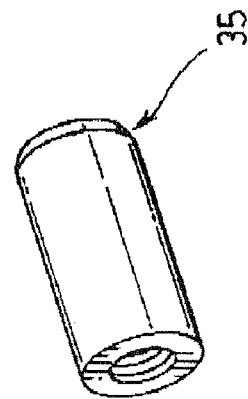
FIG. 13A is a perspective view of an alternative embodiment of the inventive fastening device.
Figure 14:
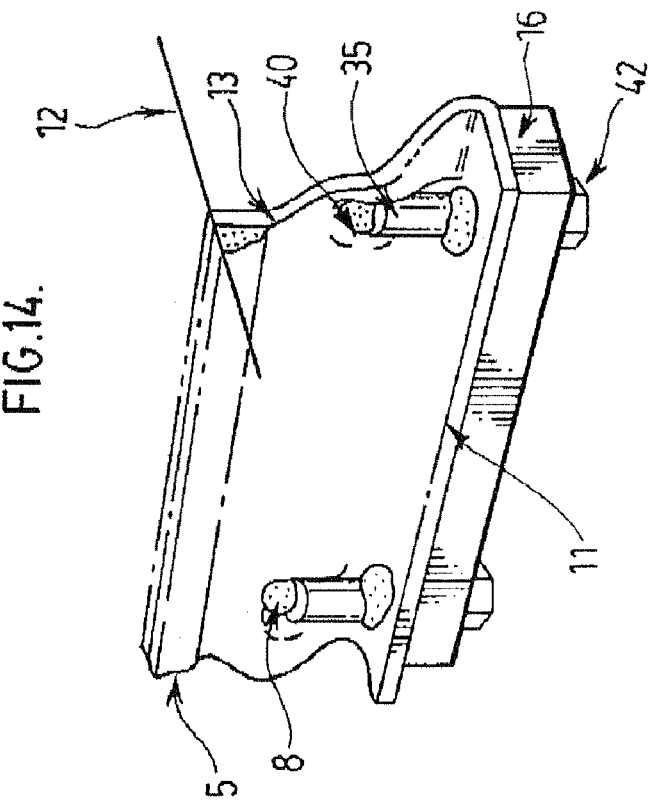
FIG. 14 is a perspective view of the alternative embodiment inventive fastening device assembled in an angle mounting bracket for mounting a loaded subcomponent to a base structure in a perpendicular orientation to the main body of the mounting bracket.

FIGS. 13 and 13A illustrate an alternative embodiment of the inventive fastening device (35) which incorporates an internally threaded portion (36). FIGS. 12 and 14 illustrate this alternative embodiment inventive fastening device (35) installed in an angle mounting bracket (11). This alternative embodiment requires the loaded subcomponent to be secured to the mounting plate (14) by generating the required clamping load via matching threaded bolts (42) rather than threaded nuts as previously described. FIG. 14 is a perspective view of the alternative embodiment showing bolts (42) which have passed through the loaded subcomponent (16) and mounting plate (11) and been threaded into the internal threaded portion of alternative fastener (35). Local formation (40) is adapted to receive and nest a similarly shaped segment of the structural portion of the fastener (35) to facilitate rigid attachment of the fastener to the bracket (13).

Although only illustrative embodiments of the invention have been provided, it will be apparent to the skilled workman that variations or modifications of the illustrated structures may be made without departing from the spirit or scope of the invention.

Without limiting the scope of such possible variations or modifications, it will be recognized that shapes of various components could be varied to achieve similar results. For example, the loaded subcomponent could be countersunk to allow a nut to be attached to the threaded portion of the fastener without said threaded portion extending beyond the exterior limit of the loaded subcomponent in the region of the fastener; or a screw could be substituted for a bolt.

The invention claimed is:

1. An angle mounting bracket and structural bridging fastener comprising:
   an angle mounting bracket that is attachable to a stable base, the bracket comprising a substantially planar main body and a mounting plate oriented perpendicular to the main body;
   said mounting plate and main body being connected through a complex formation in the angle mounting bracket;
   an integral fastener comprising a structural portion lying between and being rigidly fastened to the mounting plate and to the main body adjacent the complex formation;
   said fastener further comprising a threaded portion to connect a loaded subcomponent to the mounting plate such that an attachment point of the loaded subcomponent is aligned directly with the main body.

2. The angle mounting bracket and structural bridging fastener of claim 1, wherein:
   the structural portion of the fastener is non-threaded;
   the threaded portion of the fastener comprises a threaded rod extending from the structural portion adapted to pass through the mounting plate;
   and the loaded subcomponent comprises an opening through which the threaded portion may pass;
   whereby the loaded subcomponent may be attached to the mounting plate by means of a nut tightened onto a section of the threaded portion extending beyond the loaded subcomponent.

3. The angle mounting bracket and structural bridging fastener of claim 1, wherein:
   the structural portion of the fastener comprises an internal threaded portion adapted to receive a matching bolt;
   and the loaded subcomponent comprises an opening through which the bolt may pass;
   whereby the loaded subcomponent may be attached to the mounting plate by means of the bolt passing through both the loaded subcomponent and the mounting plate to be threaded into the threaded portion of the fastener.

4. The angle mounting bracket and structural bridging fastener of claim 2, wherein the fastener comprises a stepped shoulder at the interface of the structural portion and the threaded portion to facilitate ease of installation of the fastener to the mounting plate.

5. The angle mounting bracket and structural bridging fastener of claim 2, wherein the structural portion comprises a cylindrical extension of the threaded portion.

6. The angle mounting bracket and structural bridging fastener of claim 2, wherein the main body of the mounting bracket is configured with a local formation adapted to receive and nest a similarly shaped segment of the structural portion to facilitate rigid attachment of the fastener to the bracket.

7. The angle mounting bracket and structural bridging fastener of claim 3, wherein the main body of the mounting bracket is configured with a local formation adapted to receive and nest a similarly shaped segment of the structural portion to facilitate rigid attachment of the fastener to the bracket.

8. The angle mounting bracket and structural bridging fastener of claim 1, wherein the fastener is rigidly attached to the mounting plate and to the main body adjacent the complex formation by means of one or more of welding, adhesive bonding, riveting, clinching, upset forming or bolting.

9. The angle mounting bracket and structural bridging fastener of claim 2, wherein the fastener is rigidly attached to the mounting plate and to the main body adjacent the complex formation by means of one or more of welding, adhesive bonding, riveting, clinching, upset forming or bolting.

10. The angle mounting bracket and structural bridging fastener of claim 3, wherein the fastener is rigidly attached to the mounting plate and to the main body adjacent the complex formation by means of one or more of welding, adhesive bonding, riveting, clinching, upset forming or bolting.

11. An angle mounting bracket and structural bridging fastener adapted to secure a vehicular steering column assembly to a vehicular cross-car instrument panel structure, comprising:
 a single piece angle mounting bracket that is attachable to the instrument panel structure, the bracket comprising a substantially planar main body and a mounting plate oriented perpendicular to the main body;
 said mounting plate and main body being connected through a complex formation in the angle mounting bracket;
 an integral fastener comprising a structural portion lying between and being rigidly fastened to the mounting plate and to the main body adjacent the complex formation;
 said fastener further comprising a threaded portion to connect the vehicular steering column assembly to the mounting plate such that an attachment point of the steering column assembly is aligned directly with the main body.

12. The angle mounting bracket and structural bridging fastener of claim 11, wherein:
 the structural portion of the fastener is non-threaded;
 the threaded portion of the fastener comprises a threaded rod extending from the structural portion adapted to pass through the mounting plate;
 and the steering column assembly comprises an opening through which the threaded portion may pass;
 whereby the steering column assembly may be attached to the mounting plate by means of a nut tightened onto a portion of the threaded portion extending beyond the steering column assembly.

13. The angle mounting bracket and structural bridging fastener of claim 11, wherein:
 the structural portion of the fastener comprises an internal threaded portion adapted to receive a matching bolt;
 and the steering column assembly comprises an opening through which the bolt may pass;
 whereby the steering column assembly may be attached to the mounting plate by means of the bolt passing through both the steering column assembly and the mounting plate to be threaded into the threaded portion of the fastener.

14. The angle mounting bracket and structural bridging fastener of claim 12, wherein the fastener comprises a stepped shoulder at the interface of the structural portion and the threaded portion to facilitate ease of installation of the fastener to the mounting plate.

15. The angle mounting bracket and structural bridging fastener of claim 12, wherein the structural portion comprises a cylindrical extension of the threaded portion.

16. The angle mounting bracket and structural bridging fastener of claim 12, wherein the main body of the mounting bracket is configured with a local formation adapted to receive and nest a similarly shaped segment of the structural portion to facilitate rigid attachment of the fastener to the bracket.

17. The angle mounting bracket and structural bridging fastener of claim 13, wherein the main body of the mounting bracket is configured with a local formation adapted to receive and nest a similarly shaped segment of the structural portion to facilitate rigid attachment of the fastener to the bracket.

18. The angle mounting bracket and structural bridging fastener of claim 11, wherein the fastener is rigidly attached to the mounting plate and to the main body adjacent the complex formation by means of one or more of welding, adhesive bonding, riveting, clinching, upset forming or bolting.

19. The angle mounting bracket and structural bridging fastener of claim 12, wherein the fastener is rigidly attached to the mounting plate and to the main body adjacent the complex formation by means of one or more of welding, adhesive bonding, riveting, clinching, upset forming or bolting.

20. The angle mounting bracket and structural bridging fastener of claim 13, wherein the fastener is rigidly attached to the mounting plate and to the main body adjacent the complex formation by means of one or more of welding, adhesive bonding, riveting, clinching, upset forming or bolting.

21. An integral fastener for bridging two segments of an angle mounting bracket and to be rigidly fastened to each said segment,
 namely at a mounting plate and at a main body adjacent a complex formation of the bracket;
 said fastener comprising a structural portion to be so fastened to the bracket;
 said fastener further comprising a threaded portion to connect a loaded subcomponent to the mounting plate.

22. The fastener of claim 21, wherein:
 the structural portion of the fastener is non-threaded;
 the threaded portion of the fastener comprises a threaded rod extending from the structural portion adapted to pass through the mounting plate;
 the threaded portion being adapted to pass through an opening in the loaded subcomponent and to receive a matching nut which may be tightened to attach the loaded subcomponent to the mounting plate.

23. The fastener of claim 21, wherein:
 the structural portion of the fastener comprises an internal threaded portion adapted to receive a matching bolt,
 the bolt being adapted to pass through an opening in the loaded subcomponent, through the mounting plate and into the threaded portion such that tightening the bolt attaches the loaded subcomponent to the mounting plate.

24. The fastener of claim 22, further comprising a stepped shoulder at the interface of the structural portion and the threaded portion to facilitate ease of installation of the fastener to the mounting plate.

25. The fastener of claim 22, wherein the structural portion comprises a cylindrical extension of the threaded portion.

26. The fastener of claim 22, wherein a segment of the structural portion is shaped to be received by and nested into a local formation in the main body of the mounting bracket to facilitate rigid attachment of the fastener to the bracket.

27. The fastener of claim 23, wherein a segment of the structural portion is shaped to be received by and nested into a local formation in the main body of the mounting bracket to facilitate rigid attachment of the fastener to the bracket.

28. A method of manufacturing an integral fastener to bridge two segments of an angle mounting bracket and to be fastened to each said segment, and further to receive a loaded subcomponent to be mounted to a mounting plate on said bracket, said fastener comprising a non-threaded structural portion and a threaded portion comprising a threaded rod, the threaded portion extending from the structural portion to pass through the mounting plate and an opening in the loaded subcomponent and to receive a nut, wherein the structural portion comprises a cylindrical extension of the threaded portion, so formed for ease of manufacture, and wherein said fastener is formed by cold heading, machining, forging or similar means.

29. The angle mounting bracket and structural bridging fastener of claim 1, wherein the angle mounting bracket is attached to a stable base, and wherein the fastener threaded portion connects the loaded subcomponent to the mounting plate.

30. The angle mounting bracket and structural bridging fastener of claim 11, wherein the single piece angle mounting bracket is attached to the instrument panel structure, and wherein the fastener threaded portion connects the steering column assembly to the mounting plate.

31. The integral fastener of claim 21, wherein the fastener bridges the two segments of the angle mounting bracket and is rigidly fastened to each said segment, wherein the fastener structural portion is so fastened to the bracket.

32. The method of claim 28, wherein the fastener bridges the two segments of the angle mounting bracket and is fastened to each said segment, and wherein the fastener threaded portion extends from the structural portion and passes through the mounting plate to receive the nut.

* * * * *